(12) United States Patent
Arimilli et al.

(10) Patent No.: US 8,266,381 B2
(45) Date of Patent: Sep. 11, 2012

(54) VARYING AN AMOUNT OF DATA RETRIEVED FROM MEMORY BASED UPON AN INSTRUCTION HINT

(75) Inventors: Ravi K. Arimilli, Austin, TX (US); Gheorghe C. Cascaval, Carmel, NY (US); Balaram Sinharoy, Poughkeepsie, NY (US); William E. Speight, Austin, TX (US); Lixin Zhang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 847 days.

(21) Appl. No.: 12/024,170

(22) Filed: Feb. 1, 2008

(65) Prior Publication Data

US 2009/0198903 A1     Aug. 6, 2009

(51) Int. Cl.
*G06F 12/08* (2006.01)
(52) U.S. Cl. ...... 711/118; 711/3; 711/137; 711/E12.057; 712/207; 717/140
(58) Field of Classification Search .................. None
See application file for complete search history.

(56) References Cited

U.S. PATENT DOCUMENTS

| | | |
|---|---|---|
| 4,694,395 A | 9/1987 | Young et al. |
| 5,210,842 A | 5/1993 | Sood |
| 5,276,850 A | 1/1994 | Sakaue |
| 5,418,916 A | 5/1995 | Hall et al. |
| 5,555,391 A | 9/1996 | De Subijana et al. |
| 5,778,438 A | 7/1998 | Merchant |
| 5,802,572 A | 9/1998 | Patel et al. |
| 5,893,147 A | 4/1999 | Deng |
| 5,893,151 A | 4/1999 | Merchant |
| 5,926,829 A | 7/1999 | Hagersten et al. |
| 6,058,456 A | 5/2000 | Arimilli et al. |
| 6,122,729 A | 9/2000 | Tran |
| 6,131,145 A | 10/2000 | Matsubara et al. |
| 6,195,735 B1 * | 2/2001 | Krueger et al. ............... 711/137 |
| 6,199,107 B1 | 3/2001 | Dujari |
| 6,216,219 B1 * | 4/2001 | Cai et al. ........................ 712/207 |
| 6,321,306 B1 * | 11/2001 | Arimilli et al. ............... 711/145 |
| 6,345,341 B1 | 2/2002 | Arimilli et al. |
| 6,345,342 B1 | 2/2002 | Arimilli et al. |
| 6,353,877 B1 | 3/2002 | Duncan et al. |
| 6,356,980 B1 | 3/2002 | Arimilli et al. |

(Continued)

OTHER PUBLICATIONS

Sheu et al.; "The Selection of Optimal Cache Lines for Microprocessor Based Controllers"; Proceedings of the 23rd Annual Workshop and Symposium on Microprogramming and Micro-Architecture Micro 23, Nov. 1990.

(Continued)

*Primary Examiner* — Michael Krofcheck
(74) *Attorney, Agent, or Firm* — Yudell Isidore Ng Russell, PLLC (57) ABSTRACT

In at least one embodiment, a processor detects during execution of program code whether a load instruction within the program code is associated with a hint. In response to detecting that the load instruction is not associated with a hint, the processor retrieves a full cache line of data from the memory hierarchy into the processor in response to the load instruction. In response to detecting that the load instruction is associated with a hint, a processor retrieves a partial cache line of data into the processor from the memory hierarchy in response to the load instruction.

10 Claims, 8 Drawing Sheets

U.S. PATENT DOCUMENTS

| | | |
|---|---|---|
| 6,360,297 B1 | 3/2002 | Arimilli et al. |
| 6,446,167 B1 | 9/2002 | Mayfield et al. |
| 6,460,115 B1 | 10/2002 | Kahle et al. |
| 6,470,427 B1 | 10/2002 | Arimilli et al. |
| 6,499,085 B2 | 12/2002 | Bogin et al. |
| 6,535,962 B1 | 3/2003 | Mayfield et al. |
| 6,557,080 B1 | 4/2003 | Burger et al. |
| 6,564,302 B1 | 5/2003 | Yagi et al. |
| 6,571,319 B2 | 5/2003 | Tremblay et al. |
| 6,571,322 B2 | 5/2003 | Arimilli et al. |
| 6,615,321 B2 | 9/2003 | Arimilli et al. |
| 6,643,744 B1 | 11/2003 | Cheng |
| 6,647,466 B2 | 11/2003 | Steely, Jr. |
| 6,681,296 B2 | 1/2004 | Liao et al. |
| 6,704,860 B1 | 3/2004 | Moore |
| 6,763,433 B1 | 7/2004 | Arimilli et al. |
| 6,763,434 B2 | 7/2004 | Arimilli et al. |
| 6,772,288 B1 | 8/2004 | Flake et al. |
| 6,772,295 B2 | 8/2004 | Spencer et al. |
| 6,785,772 B2 | 8/2004 | Venkumahanti et al. |
| 6,823,447 B2 | 11/2004 | Hay et al. |
| 6,848,071 B2 | 1/2005 | Chaudhry et al. |
| 6,957,305 B2 | 10/2005 | Ray et al. |
| 6,971,000 B1 | 11/2005 | Sinharoy et al. |
| 6,978,351 B2 | 12/2005 | Osborne et al. |
| 7,028,159 B2 | 4/2006 | Matsubara et al. |
| 7,062,609 B1 | 6/2006 | Trehus et al. |
| 7,065,548 B2 | 6/2006 | van Oldenborgh et al. |
| 7,188,215 B2 | 3/2007 | Hooker |
| 7,234,040 B2 | 6/2007 | Berg et al. |
| 7,237,068 B2 | 6/2007 | Wallin et al. |
| 7,350,032 B2 | 3/2008 | Stenstrom |
| 7,380,047 B2 | 5/2008 | Emma et al. |
| 7,386,701 B2 | 6/2008 | Mowry |
| 7,441,110 B1 | 10/2008 | Puzak et al. |
| 7,533,242 B1* | 5/2009 | Moll et al. ............... 711/213 |
| 7,600,143 B1 | 10/2009 | Neuman |
| 7,958,309 B2 | 6/2011 | Arimilli et al. |
| 8,024,527 B2 | 9/2011 | Arimilli et al. |
| 2002/0087801 A1 | 7/2002 | Bogin et al. |
| 2002/0087809 A1 | 7/2002 | Arimilli et al. |
| 2002/0092029 A1 | 7/2002 | Smith |
| 2002/0112124 A1 | 8/2002 | Arimilli et al. |
| 2002/0133674 A1 | 9/2002 | Martin et al. |
| 2002/0138698 A1 | 9/2002 | Kalla |
| 2002/0174253 A1 | 11/2002 | Hayter et al. |
| 2003/0046356 A1 | 3/2003 | Alvarez et al. |
| 2003/0084250 A1 | 5/2003 | Gaither et al. |
| 2003/0110117 A1 | 6/2003 | Saidenberg et al. |
| 2003/0159005 A1 | 8/2003 | Augsburg et al. |
| 2003/0177320 A1 | 9/2003 | Sah et al. |
| 2003/0208665 A1 | 11/2003 | Peir et al. |
| 2004/0037276 A1 | 2/2004 | Henderson et al. |
| 2004/0039879 A1 | 2/2004 | Gaither |
| 2004/0049615 A1 | 3/2004 | Liang |
| 2004/0117510 A1 | 6/2004 | Arimilli et al. |
| 2004/0205298 A1 | 10/2004 | Bearden et al. |
| 2004/0260879 A1 | 12/2004 | Barroso et al. |
| 2004/0268051 A1* | 12/2004 | Berg et al. ............... 711/137 |
| 2005/0027911 A1 | 2/2005 | Hayter et al. |
| 2005/0053057 A1 | 3/2005 | Deneroff et al. |
| 2005/0080994 A1 | 4/2005 | Cohen et al. |
| 2005/0204113 A1 | 9/2005 | Harper et al. |
| 2005/0210203 A1 | 9/2005 | Stenstrom |
| 2005/0240729 A1 | 10/2005 | Van Berkel et al. |
| 2005/0240736 A1 | 10/2005 | Shaw |
| 2006/0080511 A1 | 4/2006 | Hoover et al. |
| 2006/0085600 A1 | 4/2006 | Miyashita et al. |
| 2006/0173851 A1 | 8/2006 | Singh et al. |
| 2006/0174228 A1 | 8/2006 | Radhakrishnan et al. |
| 2006/0179239 A1 | 8/2006 | Fluhr et al. |
| 2006/0179254 A1 | 8/2006 | Clark et al. |
| 2006/0184607 A1 | 8/2006 | Le Leannec et al. |
| 2006/0184746 A1 | 8/2006 | Guthrie et al. |
| 2006/0184772 A1 | 8/2006 | Dooley et al. |
| 2006/0212648 A1 | 9/2006 | Cox et al. |
| 2006/0251092 A1 | 11/2006 | Matterne et al. |
| 2006/0259707 A1 | 11/2006 | Freytag |
| 2006/0265552 A1 | 11/2006 | Davis et al. |
| 2007/0038846 A1 | 2/2007 | Kadambi et al. |
| 2007/0050592 A1 | 3/2007 | Gschwind et al. |
| 2007/0058531 A1 | 3/2007 | Dierks et al. |
| 2007/0079073 A1 | 4/2007 | Rosenbluth et al. |
| 2007/0083716 A1 | 4/2007 | Rajamony et al. |
| 2007/0088919 A1 | 4/2007 | Shen et al. |
| 2007/0094450 A1 | 4/2007 | VanderWiel |
| 2007/0136374 A1 | 6/2007 | Guedalia |
| 2007/0168619 A1 | 7/2007 | Hutton et al. |
| 2007/0214335 A1 | 9/2007 | Bellows et al. |
| 2007/0220208 A1 | 9/2007 | Nomura et al. |
| 2007/0294264 A1 | 12/2007 | Bayardo, Jr. et al. |
| 2008/0056051 A1 | 3/2008 | Mayer et al. |
| 2008/0086602 A1 | 4/2008 | Guthrie et al. |
| 2008/0091921 A1 | 4/2008 | Abuaiadh et al. |
| 2008/0104330 A1 | 5/2008 | Deshpande |
| 2008/0183972 A1 | 7/2008 | Dieffenderfer |
| 2008/0244185 A1 | 10/2008 | O'Krafka et al. |
| 2008/0256303 A1 | 10/2008 | Croxford et al. |
| 2009/0198865 A1 | 8/2009 | Arimilli et al. |
| 2009/0198912 A1 | 8/2009 | Arimilli et al. |
| 2009/0198914 A1 | 8/2009 | Arimilli et al. |
| 2009/0198960 A1 | 8/2009 | Arimilli et al. |

OTHER PUBLICATIONS

Milenkovic et al.; "Compiler and Runtime Hints for Memory Management"; IBM TDB n8b, pp. 76-77, Jan. 1990.

Song; "Methods of Specifying Data Pre-Fetching Without Using a Separate Instruction"; IBM TDB vol. 38, No. 6, pp. 355-356, Jun. 1995.

Hazim; "System and Method to Improve Hardware Pre-Fetching Using Translation Hints"; DOSS# AUS920040822, Oct. 2004.

Wang; "Cooperative Hardware/Software Caching for Next Generation Memory Systems"; vol. 6501B of Dissertations Abstracts International, 2004.

Funk et al.; "Instruction Cache Block Retro-Fitted onto Microprocessor"; IBM TDB vol. 28, No. 7, pp. 53-56, Jul. 1995.

Van Peursem; "A New Hardware Pre-Fetching Scheme Based on Dynamic Interpretation of the Instruction Stream Cache"; vol. 5509B of Dissertations Abstracts International; 1994.

Duncan et al.; "High Performance I/O Design in the Alphaserver 4100 Symmetric Mutliprocessing System"; Digital Technical Journal; vol. 8; No. 4; p. 61-75; 1996.

Tian et al.: "A Unified Compressed Cache Hierarchy Using Simple Frequent Pattern Compression and Partial Cache Line Pre-Fetching"; Embedded Software and Systems; Third International Conference; ICESS 2007; May 2007.

U.S. Appl. No. 12/024,467, "Interconnect Operation Indicating Acceptability of Partial Data Delivery," Notice of Allowance dated Oct. 5, 2010.

U.S. Appl. No. 12/024,165, "Method and System for Sourcing Differing Amounts of Prefetch Data in Response to Data Prefetch Requests," Non-Final Office Action dated Nov. 16, 2011.

U.S. Appl. No. 12/024,165, "Method and System for Sourcing Differing Amounts of Prefetch Data in Response to Data Prefetch Requests," Final Office Action dated Apr. 27, 2011.

Guo et al.;"Cooperative Caching for Peer Assisted Video Distribution"; Advances in Multimedia Modeling, 13th International Multimedia Modeling Conference; MMM 2007; Lecture Notes in Computer Science; vol. 4351; pp. 135-144.

Emma et al.; "Partial Store Lines in Store in Caches"; IBM TDB; p. 4240; Dec. 1984.

J. Hoogerbrugge; "Cost Effiecient Branch Target Buffers" Euro-Par 2004 Parallel Processing; 10th International Euro-Par Conference; Lecture Notes in Computer Science; vol. 1900; pp. 950-959; Aug.-Sep. 2000.

Parmentier et al.; "Cache Based Parallelization of Multiple Sequence Alignment Problem"; Euro-Par Parallel Processing; 10th International Euro-Par Conference; Lecture Notes in Computer Science; vol. 3149; pp. 950-959 Sep. 2004.

Hwang et al.; "Delayed Precise Invalidation a Software Cache Coherence Scheme"; IEEE Proceeding Computer and Digital Techniques; vol. 143, No. 5, pp. 337-344; Sep. 1996.

Gilbert et al.;"Distributed Data Cache Designs for Clustered VLIW Processors"; IEEE Transactions on Computers; vol. 54, No. 10, pp. 1227-1241; Oct. 2005.

U.S. Appl. No. 12/024,392, "Claiming Coherency Ownership of a Partial Cache Line of Data," Non-Final Office Action dated Jan. 12, 2011.

U.S. Appl. No. 12/024,392, "Claiming Coherency Ownership of a Partial Cache Line of Data," Non-Final Office Action dated Jun. 13, 2011.

U.S. Appl. No. 12/024,424, "Data Processing System, Processor and Method that Perform a Partial Cache Line Storage-Modifying Operation Based upon a Hint," Non-Final Office Action dated Sep. 28, 2010.

U.S. Appl. No. 12/024,424, "Data Processing System, Processor and Method that Perform a Partial Cache Line Storage-Modifying Operation Based upon a Hint," Non-Final Office Action dated Aug. 12, 2011.

U.S. Appl. No. 12/024,447, "Data Processing System, Processor and Method for Implementing Cache Management for Partial Cache Line Operations, " Non-Final Office Action dated Sep. 28, 2010.

U.S. Appl. No. 12/024,447, "Data Processing System, Processor and Method for Implementing Cache Management for Partial Cache Line Operations, " Notice of Allowance dated Aug. 19, 2011.

U.S. Appl. No. 12/024,174, "Touch of a Partial Cache Line of Data," Non-Final Office Action dated Jan. 20, 2011.

U.S. Appl. No. 12/024,174, "Touch of a Partial Cache Line of Data," Final Office Action dated Jul. 1, 2011.

U.S. Appl. No. 12/024,467, "Interconnect Operation Indicating Acceptability of Partial Data Delivery," Non-Final Office Action dated Oct. 13, 2010.

U.S. Appl. No. 12/024,467, "Interconnect Operation Indicating Acceptability of Partial Data Delivery," Final Office Action dated Feb. 7, 2011.

U.S. Appl. No. 12/024,467, "Interconnect Operation Indicating Acceptability of Partial Data Delivery," Non-Final Office Action dated May 17, 2011.

U.S. Appl. No. 12/024,432, "Partial Cache Line Accesses Based on Memory Access Patterns," Non-Final Office Action dated Sep. 24, 2010.

U.S. Appl. No. 12/024,432, "Partial Cache Line Accesses Based on Memory Access Patterns," Final Office Action dated Jan. 10, 2011.

U.S. Appl. No. 12/024,432, "Partial Cache Line Accesses Based on Memory Access Patterns," Notice of Allowance dated May 16, 2011.

US Patent No. 7958309, "Dynamic Selection of a Memory Access Size," Non-Final Office Action dated Oct. 20, 2010.

US Patent No. 7958309, "Dynamic Selection of a Memory Access Size," Notice of Allowance dated Jan. 31, 2011.

U. S. Appl. No. 12/424,716, "Specifying an Access Hint for Prefetching Partial Cache Block Data in a Cache Hierarchy", Non-Final Office Action dated Aug. 31, 2011.

U.S. Appl. No. 12/424,434, "Updating Partial Cache Lines in a Data Processing System," Notice of Allowance dated Aug. 4, 2011.

U.S. Appl. No. 12/024,174, "Touch of a Partial Cache Line of Data," Final Office Action dated Oct. 5, 2011.

U.S. Appl. No. 12/024,392, "Claiming Coherency Ownership of a Partial Cache Line of Data," Final Office Action dated Nov. 18, 2011.

U.S. Appl. No. 12/024,165, "Method and System for Sourcing Differing Amounts of Prefetch Data in Response to Data Prefetch Requests," Non-Final Office Action dated Oct. 4, 2011.

U.S. Appl. No. 12/424,681, "Specifying an Access Hint for Prefetching Limited use Data in a Cache Hierarchy," Non-Final Office Action dated Sep. 6, 2011.

U.S. Appl. No. 12/424,681, "Specifying an Access Hint for Prefetching Limited use Data in a Cache Hierarchy," Notice of Allowance dated Jan. 4, 2012.

U.S. Appl. No. 12/424,432, "Partial Cache Line Accesses Based on Memory Access Patterns," Notice of Allowance dated Jul. 22, 2011.

U.S. Appl. No. 12/424,716, "Specifying an Access Hint for Prefetching Partial Cache Block Data in a Cache Hierarchy," Notice of Allowance dated Nov. 22, 2011.

U.S. Appl. No. 12/424,447, "Cache Management for Partial Cache Line Operations," Notice of Allowance dated Sep. 20, 2011.

U.S. Appl. No. 12/424,434, "Updating Partial Cache Lines in a Data Processing System," Notice of Allowance dated Oct. 6, 2011.

U.S. Appl. No. 12/024,467, " Interconnect Operation Indicating Acceptability of Partial Data Delivery," Notice of Allowance dated Oct. 5, 2011.

U.S. Appl. No. 12/024,424, "Partial cache Line Storage-Modifying Operation based upon a Hint," Notice of Allowance dated Dec. 1, 2011.

* cited by examiner

VARYING AN AMOUNT OF DATA RETRIEVED FROM MEMORY BASED UPON AN INSTRUCTION HINT

This invention was made with United States Government support under Agreement No. HR0011-07-9-0002 awarded by DARPA. The Government has certain rights in the invention.

BACKGROUND OF THE INVENTION

1. Technical Field

The present invention relates in general to data processing and, in particular, retrieving data from a memory hierarchy.

2. Description of the Related Art

A conventional symmetric multiprocessor (SMP) computer system, such as a server computer system, includes multiple processing units all coupled to a system interconnect, which typically comprises one or more address, data and control buses. Coupled to the system interconnect is a system memory, which represents the lowest level of volatile memory in the multiprocessor computer system and which generally is accessible for read and write access by all processing units. In order to reduce access latency to instructions and data residing in the system memory, each processing unit is typically further supported by a respective multi-level cache hierarchy, the lower level(s) of which may be shared by one or more processor cores.

SUMMARY OF THE INVENTION

In at least one embodiment, a processor detects during execution of program code whether a load instruction within the program code is associated with a hint. In response to detecting that the load instruction is not associated with a hint, the processor retrieves a full cache line of data from the memory hierarchy into the processor in response to the load instruction. In response to detecting that the load instruction is associated with a hint, a processor retrieves a partial cache line of data into the processor from the memory hierarchy in response to the load instruction.

DETAILED DESCRIPTION OF ILLUSTRATIVE EMBODIMENT

Figure 1:
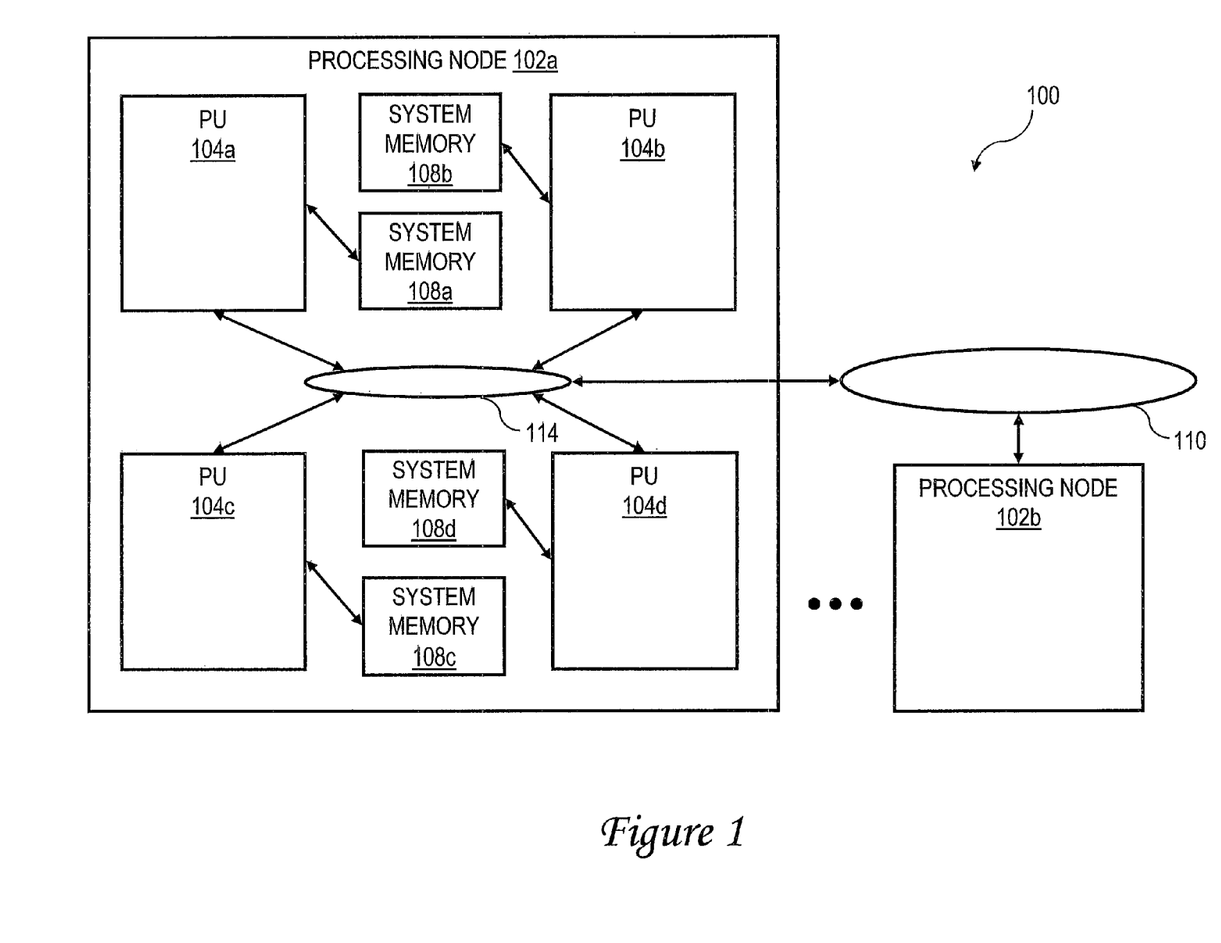
FIG. 1 is a high level block diagram of an exemplary data processing system in accordance with the present invention.

With reference now to the figures and, in particular, with reference to FIG. 1, there is illustrated a high level block diagram of an exemplary embodiment of a cache coherent symmetric multiprocessor (SMP) data processing system in accordance with the present invention. As shown, data processing system 100 includes multiple processing nodes 102a, 102b for processing data and instructions. Processing nodes 102a, 102b are coupled to a system interconnect 110 for conveying address, data and control information. System interconnect 110 may be implemented, for example, as a bused interconnect, a switched interconnect or a hybrid interconnect.

In the depicted embodiment, each processing node 102 is realized as a multi-chip module (MCM) containing four processing units 104a-104d, each preferably realized as a respective integrated circuit. The processing units 104a-104d within each processing node 102 are coupled for communication by a local interconnect 114, which, like system interconnect 110, may be implemented with one or more buses and/or switches. The devices coupled to each local interconnect 114 include not only processing units 104, but also one or more system memories 108a-108d. Data and instructions residing in system memories 108 can generally be accessed and modified by a processor core in any processing unit 104 in any processing node 102 of data processing system 100. In alternative embodiments of the invention, one or more system memories 108 can be coupled to system interconnect 110 rather than a local interconnect 114.

Those skilled in the art will appreciate that SMP data processing system 100 can include many additional unillustrated components, such as interconnect bridges, non-volatile storage, ports for connection to networks or attached devices, etc. Because such additional components are not necessary for an understanding of the present invention, they are not illustrated in FIG. 1 or discussed further herein. It should also be understood, however, that the enhancements provided by the present invention are applicable to data processing systems of diverse architectures and are in no way limited to the generalized data processing system architecture illustrated in FIG. 1.

Figure 2:
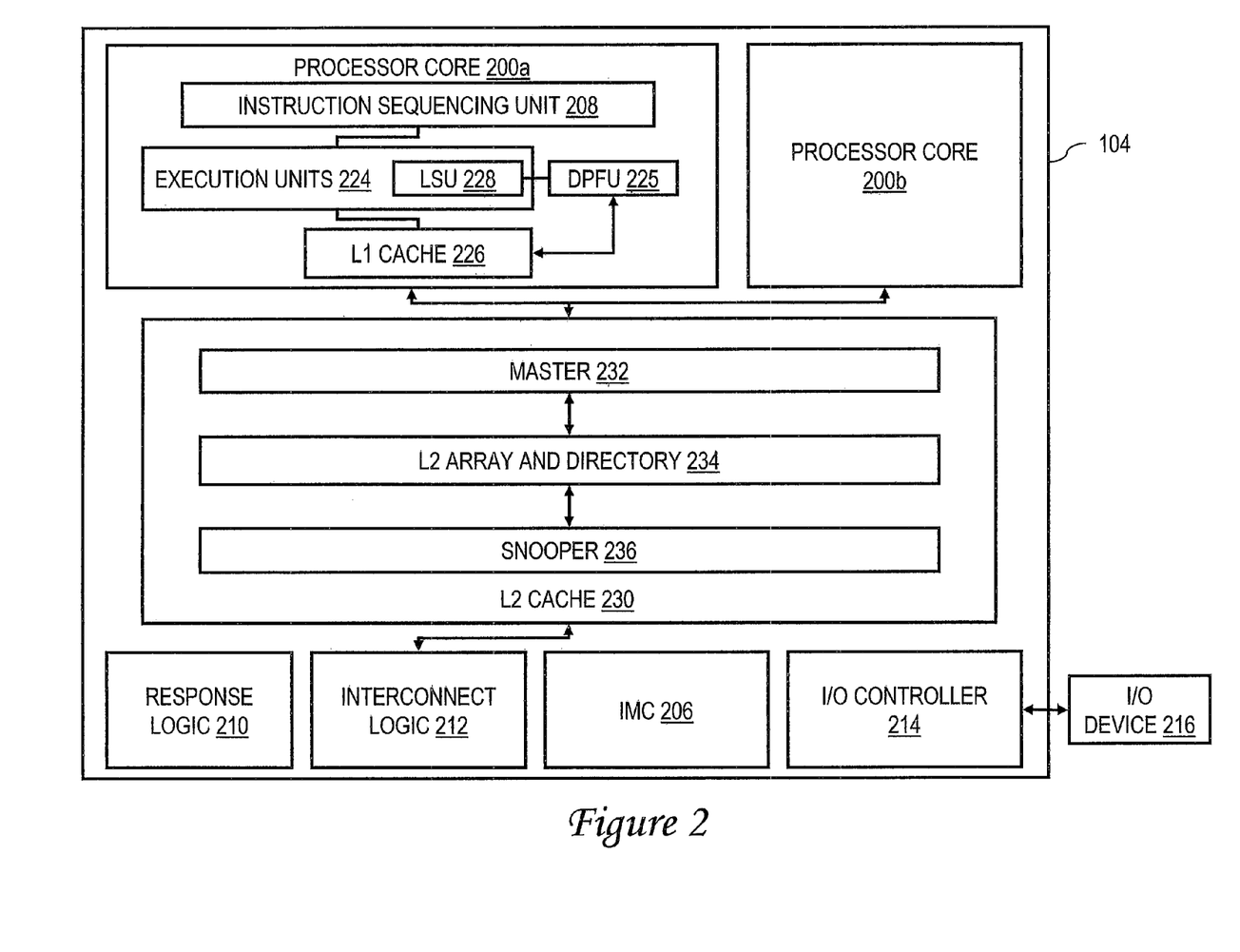
FIG. 2 is a more detailed block diagram of a processing unit in accordance with the present invention.

Referring now to FIG. 2, there is depicted a more detailed block diagram of an exemplary processing unit 104 in accordance with the present invention. In the depicted embodiment, each processing unit 104 includes two processor cores 200a, 200b for independently processing instructions and data. Each processor core 200 includes at least an instruction sequencing unit (ISU) 208 for prefetching and demand fetching instructions and for ordering instructions for execution by one or more execution units 224. Execution units 224 preferably include a load-store unit (LSU) 228 for executing memory access instructions that references a memory block or cause the generation of an operation referencing a memory block. In at least some embodiments, each processor core 200 is capable of simultaneously executing instructions within two or more hardware threads of execution. Each processor core 200 preferably includes a data prefetch unit (DPFU) 225 that prefetches data in advance of demand.

The operation of each processor core 200 is supported by a multi-level volatile memory hierarchy having at its lowest level shared system memories 108a-108d, and at its upper levels one or more levels of cache memory. In the depicted embodiment, each processing unit 104 includes an integrated memory controller (IMC) 206 that controls read and write access to a respective one of the system memories 108a-108d within its processing node 102 in response to requests received from processor cores 200a-200b and operations snooped on the local interconnect 114.

In the illustrative embodiment, the cache memory hierarchy of processing unit 104 includes a store-through level one (L1) cache 226 (which may be bifurcated into separate L1 instruction and data caches) within each processor core 200 and a level two (L2) cache 230 shared by all processor cores 200a, 200b of the processing unit 104. L2 cache 230 includes an L2 array and directory 234 and a cache controller comprising a master 232 and a snooper 236. Master 232 initiates transactions on local interconnect 114 and system interconnect 110 and accesses L2 array and directory 234 in response to memory access (and other) requests received from the associated processor cores 200a-200b. Snooper 236 snoops operations on local interconnect 114, provides appropriate responses, and performs any accesses to L2 array and directory 234 required by the operations.

Although the illustrated cache hierarchy includes only two levels of cache, those skilled in the art will appreciate that alternative embodiments may include additional levels (L3, L4, L5 etc.) of on-chip or off-chip in-line, lookaside or victim cache, which may be fully inclusive, partially inclusive, or non-inclusive of the contents the upper levels of cache.

Each processing unit 104 further includes an instance of response logic 210, which implements a portion of the distributed coherency signaling mechanism that maintains cache coherency within data processing system 100. In addition, each processing unit 104 includes an instance of interconnect logic 212 for selectively forwarding communications between its local interconnect 114 and system interconnect 110. Finally, each processing unit 104 includes an integrated I/O (input/output) controller 214 supporting the attachment of one or more I/O devices, such as I/O device 216. I/O controller 214 may issue operations on local interconnect 114 and/or system interconnect 110 in response to requests by I/O device 216.

Figure 3:
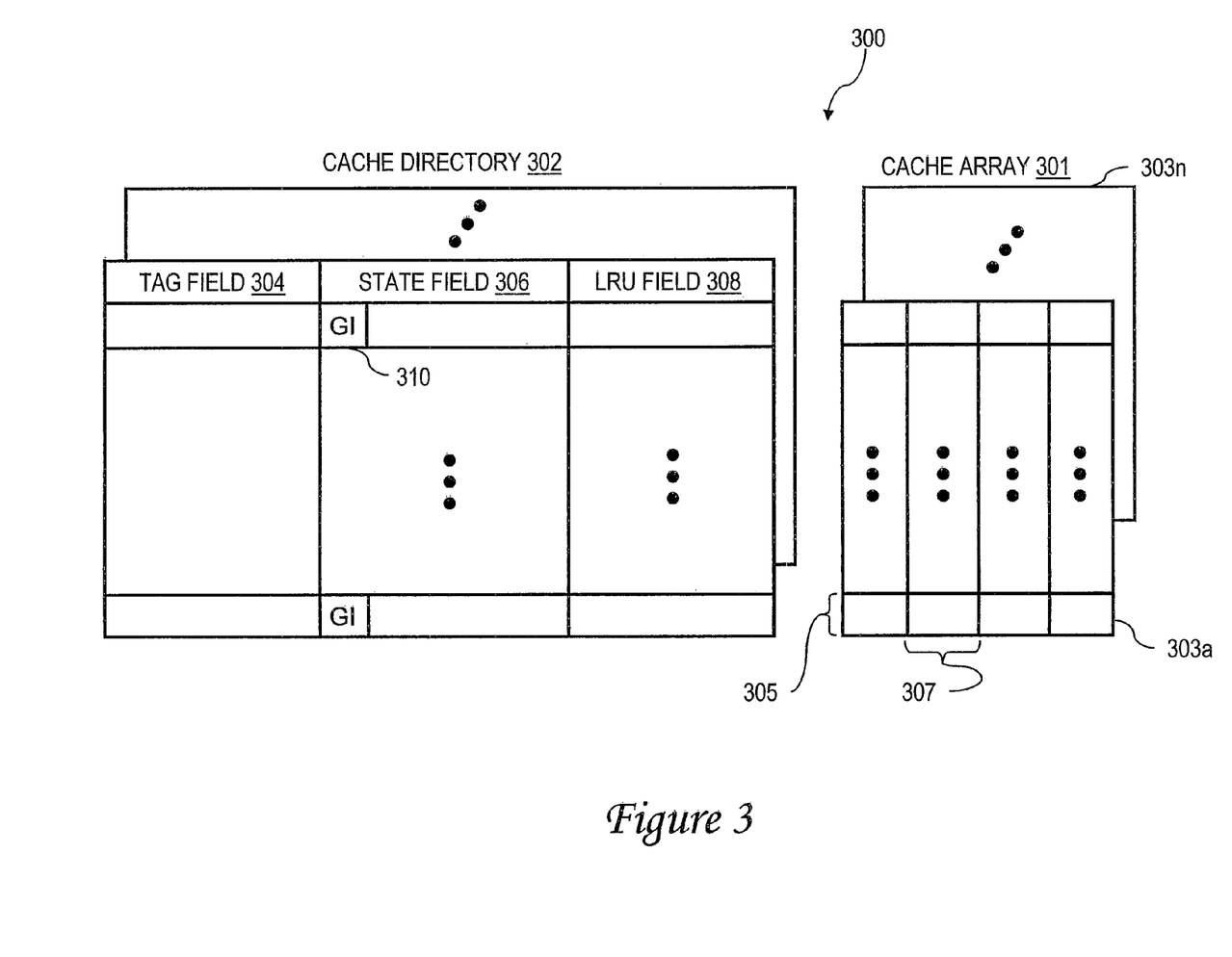
FIG. 3 is a more detailed block diagram of a cache array and directory in accordance with the present invention.

With reference now to FIG. 3, there is illustrated a more detailed block diagram of an exemplary embodiment of a cache array and directory 300, which may be utilized, for example, to implement the cache array and directory of an L1 cache 226 or L2 cache array and directory 234. As illustrated, cache array and directory 300 includes a set associative cache array 301 including multiple ways 303a-303n. Each way 303 includes multiple entries 305, each providing temporary storage for up to a full cache line of data, e.g., 128 bytes. Each cache line of data is logically formed of multiple granules 307 (in this example, four granules of 32 bytes each) that may correspond in size, for example, to the smallest allowable access to system memories 108. In accordance with the present invention, granules 307 may be individually accessed and cached in cache array 301.

Cache array and directory 300 also includes a cache directory 302 of the contents of cache array 301. As in conventional set associative caches, memory locations in system memories 108 are mapped to particular congruence classes within cache arrays 301 utilizing predetermined index bits within the system memory (real) addresses. The particular cache lines stored within cache array 301 are recorded in cache directory 302, which contains one directory entry for each cache line in cache array 301. As understood by those skilled in the art, each directory entry in cache directory 302 comprises at least a tag field 304, which specifies the particular cache line stored in cache array 300 utilizing a tag portion of the corresponding real address, a LRU (Least Recently Used) field 308 indicating a replacement order for the cache line with respect to other cache lines in the same congruence class, and a state field 306, which indicates the coherency state of the cache line.

According to the present invention, coherency states that may be utilized in state field 306 to indicate state information may be defined by the well-known MESI coherency protocol or a variant thereof. To support caching of partial cache lines in cache array 301, cache directory 302 preferably indicates which granule(s) 307 are cached in the associated entry 305. For example, in one embodiment, each state field 306 includes a granule identifier (GI) 310 that indicates which granule(s) of the cache line identified by the tag in tag field 304 are held in the associated entry 305 of cache array 301. In at least some embodiments, when GI 310 indicates that fewer than all granules of a cache line are held in the associated entry 305, state field 306 preferably indicates a "Partial" coherency state that indicates that less than the complete cache line is held by cache array 301. In such embodiments, the Partial coherency state functions like the Shared coherency state of the MESI protocol, meaning that a full copy of the cache line must be obtained prior to modification of the contents of the cache line.

Figure 4:
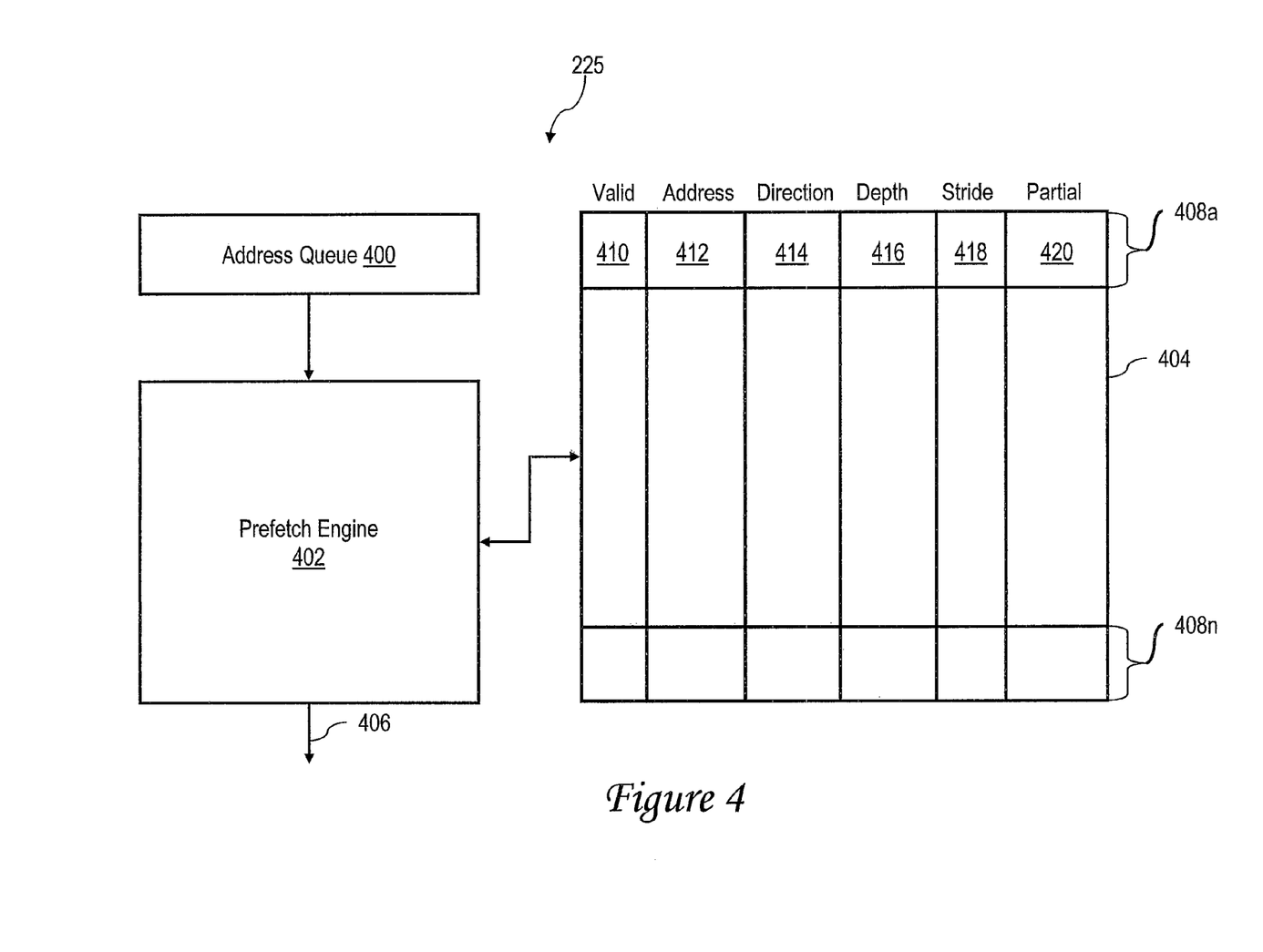
FIG. 4 is a more detailed block diagram of the data prefetch unit of FIG. 1.

Referring now to FIG. 4, there is depicted a more detailed block diagram of an exemplary data prefetch unit (DPFU) 225 in accordance with the present invention. As shown, DPFU 225 includes an address queue 400 that buffers incoming memory access addresses generated by LSU 228, a prefetch request queue (PRQ) 404, and a prefetch engine 402 that generates data prefetch requests 406 by reference to PRQ 404.

Prefetch requests 406 cause data from the memory subsystem to be fetched or retrieved into L1 cache 228 and/or L2 cache 230 preferably before the data is needed by LSU 228. The concept of prefetching recognizes that data accesses frequently exhibit spatial locality. Spatial locality suggests that the address of the next memory reference is likely to be near the address of recent memory references. A common manifestation of spatial locality is a sequential data stream, in which data from a block of memory is accessed in a monotonically increasing (or decreasing) sequence such that contiguous cache lines are referenced by at least one instruction. When DPFU 225 detects a sequential data stream (e.g., references to addresses in adjacent cache lines), it is reasonable to predict that future references will be made to addresses in cache lines that are adjacent to the current cache line (the cache line corresponding to currently executing memory references) following the same direction. Accordingly, DPFU 225 generates data prefetch requests 406 to retrieve one or more of these adjacent cache lines before the program actually requires them. As an example, if a program loads an element from a cache line n, and then loads an element from cache line n+1, DPFU 225 may prefetch cache some or all of cache lines n+2 and n+3, anticipating that the program will soon load from those cache lines also.

As further depicted in FIG. 4, in at least some embodiments, PRQ 404 includes a plurality of stream registers 408. In the depicted embodiment, each stream register 408 contains several fields describing various attributes of a corresponding sequential data stream. These fields include a valid field 410, an address field 412, a direction field 414, a depth field 416, a stride field 418, and a partial field 420. Valid field 410 indicates whether or not the contents of its stream register 408 are valid. Address field 402 contains the base address (effective or real) of a cache line or partial cache line in the sequential data stream. Direction field 414 indicates whether addresses of cache lines in the sequential data stream are increasing or decreasing. Depth field 416 indicates a number of cache lines or partial cache lines in the corresponding sequential data stream to be prefetched in advance of demand. Stride field 418 indicates an address interval between adjacent cache lines or partial cache lines within the sequential data stream. Finally, partial field 420 indicates which one(s) of the granules 307 of a cache line in the sequential data stream should be prefetched. For example, in an exemplary embodiment, partial field 418 includes one bit for each granule 307 of a cache line, and prefetch engine 402 of DPFU 225 sets either a single bit within partial field 418 (e.g., to a logical "1") to indicate a particular granule 307 to be prefetched by data prefetch requests 406 within the sequential data stream or sets all bits within partial field 418 to indicate that data prefetch requests 406 within the sequential data stream should request full cache lines.

Figure 5A:
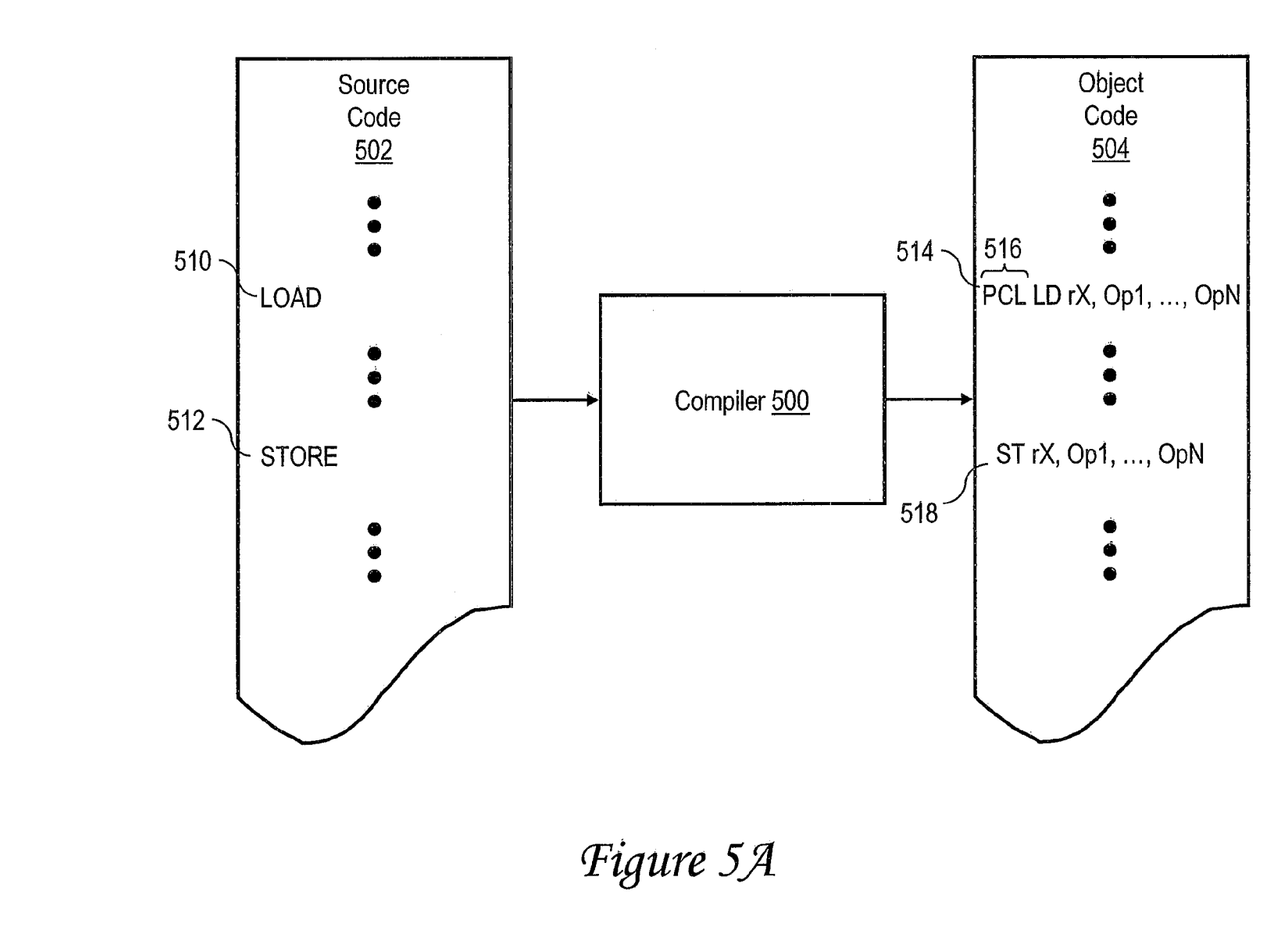
FIG. 5A depicts a compiler processing pre-processed code, such as source code, to obtain post-processed code, such as object code, that contains a hint regarding an amount of data to retrieve from a memory hierarchy with a load instruction.

With reference now to FIG. 5A, there is illustrated an exemplary process in accordance with the present invention for marling program code with hints indicating an amount of data to retrieve from a memory hierarchy with a demand load instruction. In the depicted process, program code, such as compiler 500, executing on a data processing system such as data processing system 100 of FIG. 1, receives pre-processed code, such as source code 502 or intermediate code, and compiles the pre-processed code to obtain post-processed code, such as object code 504.

As indicated, source code 502 includes one or more memory access constructs, such as load instruction 510 and store instruction 512. Load instruction 510 specifies data to be loaded from a memory hierarchy by a processor, and store instruction specifies data to be stored into the memory hierarchy by the processor. In response to processing source code 502, compiler 500 generates object code 504 containing a load instruction 514 corresponding to load instruction 510 and a store instruction 518 corresponding to store instruction 512. In the exemplary embodiment, load instruction 514 specifies at least one register identifier (e.g., rX) of an architected register into which data is to be loaded and one or more operands (e.g., Op1-OpN) from which the target memory address of the indicated load operation is to be computed. Generally, operands Op1-OpN can be identified, for example, utilizing register identifier(s), memory address(es), direct specification of an immediate operand, and/or an offset. As shown, load instruction 514 may further includes a hint 516 provided by compiler 500 in accordance with the process of FIG. 5B that indicates that load instruction 514 should retrieve less than a complete cache line of data from the memory hierarchy.

Figure 5B:
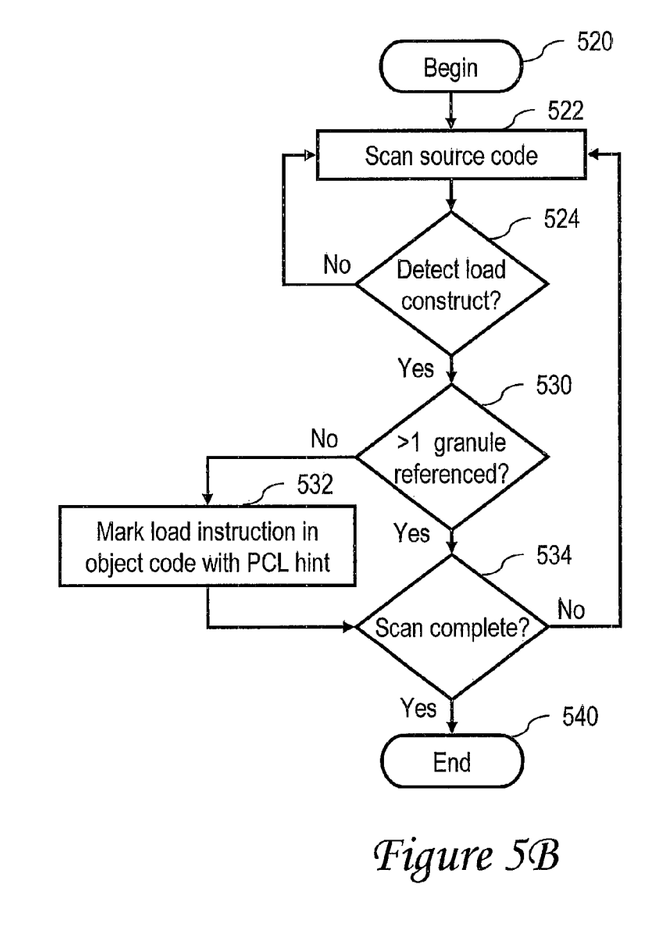
FIG. 5B is a high level logical flowchart of an exemplary process by which a compiler marks a load instruction with a hint regarding an amount of data to retrieve from a memory hierarchy.

Referring now to FIG. 5B, there is depicted a high level logical flowchart of an exemplary process by which program code, such as compiler 500, processes pre-processed code, such as source code 502, to obtain post-processed code, such as object code 504, containing hints indicating an amount of data to be retrieved from a memory hierarchy by a demand load instruction. The illustrated process can be performed, for example, as part of the code optimization operations of compiler 500.

As shown, the process begins at block 520 and then proceeds to block to blocks 522-524, which depict compiler 500 scanning source code 502 until a load construct, such as load instruction 510, which causes data to be retrieved from the memory hierarchy is detected. In response to detection of the load construct, the process proceeds to block 530, which illustrates compiler 500 determining whether more than one granule 307 of the cache line of data targeted by the load construct is subsequently referenced by source code 502, for example, by one or more arithmetic instructions, logical instructions, or memory access instructions (e.g., store instruction 512). If so, the process passes directly to block 534, which is described below. If, however, compiler 500 determines that only one granule 307 of the target cache line of data is subsequently referenced, compiler 500 marks the load instruction 514 corresponding to the detected load construct with a partial cache line (PCL) hint 516, which indicates that only a partial cache line should be retrieved from memory and preferably further indicates which granule(s) 307 should be retrieved. Following block 532, the process proceeds to block 534, which illustrates a determination whether or not the scan of source code 502 is complete. If so, the process terminates at block 540. If not, the process returns to block 522, which has been described.

Although FIG. 5B depicts an exemplary process in which the resulting object code 504 contains load instructions that will request either a full cache line (e.g., 128 bytes) or a single predetermined subset of full cache line, such as a single granule (e.g., 32 bytes), in other embodiments compiler 500 may provide partial cache line (PCL) hints for multiple sizes of partial cache lines. In either case, the amount of data loaded by demand load instructions in object code 504 is selected responsive to the amount of data actually usefully referenced by other instructions in object code 504.

Figure 6A:
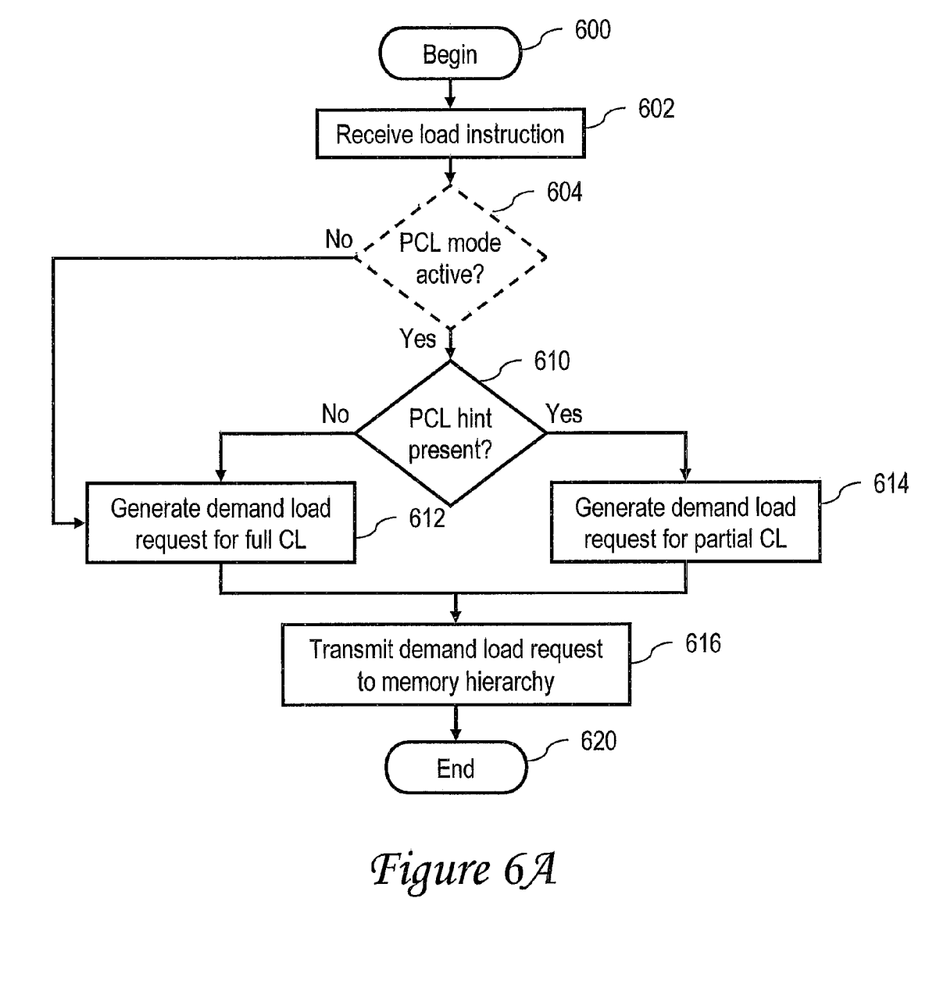
FIG. 6A is a high level logical flowchart of an exemplary process by which an execution unit of a processor generates demand load requests for varying amounts of data in accordance with the present invention.

With reference now to FIG. 6A, there is illustrated a high level logical flowchart of an exemplary process by which a processor processes load instructions in accordance with the present invention. The process begins at block 600 and then proceeds to block 602, which illustrates an execution unit of a processor, such as LSU 228, receiving a load instruction, such as load instruction 514 of object code 504. As indicated by dashed line illustration, the processor may optionally determine at block 604 whether or not a partial cache line mode is active, for example, by reference to the contents of an internal register. If the partial cache line mode is active or if no mode determination is made, the process proceeds to block 610, which is described below. If, however, a mode determination is made and the partial cache mode is not active, the process passes to block 612, which is described below.

Referring now to block 610, an execution unit of a processor, such as LSU 228, determines whether the load instruction is marked with a partial cache line (PCL) hint, such as PCL hint 516. If not, the process passes to block 612, which illustrates the execution unit processing the load instruction to generate a demand load request for a full cache line of data. Generating the demand load request includes, for example, computing the target memory address from which data is to be loaded. If, on the other hand, the execution unit of the processor determines at block 610 that the load instruction is marked with a PCL hint, the execution unit (e.g., LSU 228) generates a demand load request for a partial cache line of data in accordance with the PCL hint. Thus, the demand load request includes an indication of a partial cache line comprising one or more granules 307 that is to be fetched from the memory hierarchy. Following either block 612 or block 614, the process proceeds to block 616. Block 616 illustrates the execution unit (e.g., LSU 228) transmitting the demand load request to the memory hierarchy to retrieve a partial or full cache line of data from the memory hierarchy into the processor core 200. Thereafter, the process depicted in FIG. 6A terminates at block 620.

Figure 6B:
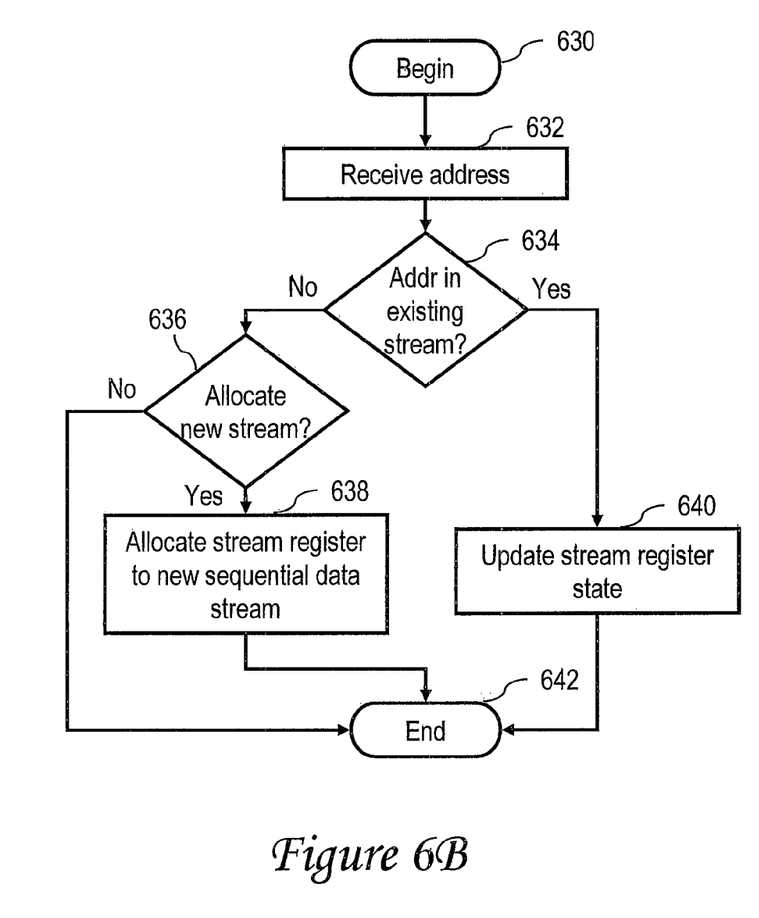
FIG. 6B is a high level logical flowchart of an exemplary process by which a data prefetch unit allocates entries in a prefetch request queue in accordance with the present invention.

In at least some embodiments, load hint information can be utilized to influence the amount of data retrieved from the memory hierarchy by data prefetching. With reference now to FIG. 6B, there is depicted a high level logical flowchart of an exemplary process by which DPFU 225 allocates entries in PRQ 404 in accordance with the present invention. The process begins at block 630 and the proceeds to block 632, which depicts DPFU 225 receiving from LSU 228 within address queue 400 a memory access address (e.g., effective or real address) of a demand memory access. The process then proceeds to block 634, which depicts prefetch engine 402 of DPFU 225 determining by reference to PRQ 404 whether or not the address received at block 632 falls within an existing sequential data stream to which a stream register 408 has been allocated. If prefetch engine 402 determines at block 634 that the address belongs to an existing sequential data stream, the process proceeds to block 640, which is described below. If prefetch engine 402 determines at block 634 that the address does not belong to an existing sequential data stream, prefetch engine 402 determines at block 636 whether or not to allocate a new sequential data stream, for example, based upon a miss for the memory access address in L1 cache 226, the availability of an unallocated stream register 408, and/or previous receipt of a closely spaced memory access address.

If prefetch engine 402 determines to not allocate a new sequential data stream at block 636, the process shown in FIG. 6B simply terminates at block 642. If however, prefetch engine 402 determines to allocate a new sequential data stream at block 636, prefetch engine 402 allocates one of stream registers 408 to the sequential data stream and populates fields 410-420 of the allocated stream register 408 (block 638). In particular, prefetch engine 402 sets partial field 420 to indicate a full cache line if the detected memory access is not marked with a PCL hint 516 and sets partial field 420 to indicate a partial cache line if the detected memory access is marked with a PCL hint 516. As will be appreciated, allocation of the stream register 408 may entail selection of a stream buffer 408 based upon, for example, the contents of usage history fields 420 of stream registers 408 and/or unillustrated replacement history information indicating a stream register 408 to be replaced according to a replacement algorithm, such as Least Recently Used (LRU) or round robin. Following block 638, the process terminates at block 642.

Referring now to block 640, in response to a determination that the memory access address received at block 501 falls within an existing sequential data stream to which a stream register 408 has been allocated in PRQ 404, prefetch engine 402 updates the state of the stream register 408 allocated to the sequential data stream. For example, prefetch engine 402 may update address field 412 with the memory access address or modify depth field 416 or stride field 418. Following block 640, the process terminates at block 642.

Figure 6C:
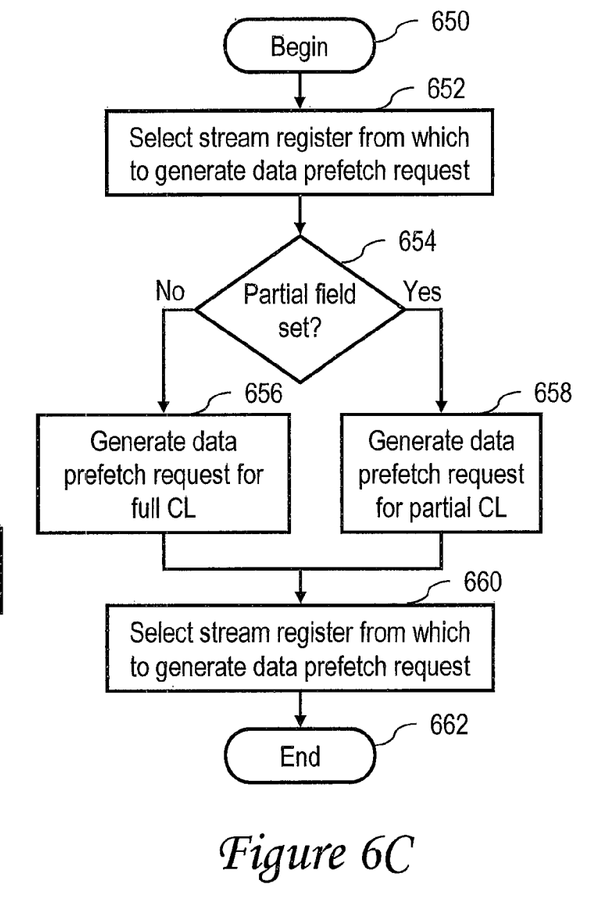
FIG. 6C is a high level logical flowchart of an exemplary process by which a data prefetch unit generates data prefetch requests for varying amounts of data in accordance with the present invention.

With reference now to FIG. 6C, there is illustrated a high level logical flowchart of an exemplary process by which DPFU 225 generates data prefetch requests 406 in accordance with the present invention. According to at least some embodiments, DPFU 225 varies an amount of data requested by data prefetch requests 406 based upon hint information within the program code under execution.

The process depicted in FIG. 6C begins at block 650 and then proceeds to block 652, which illustrates prefetch engine 402 selecting a stream register 408 from which to generate a data prefetch request 406, for example, based upon demand memory access addresses received from LSU 228, the contents of usage history fields 420, and/or a selection ordering algorithm, such as Least Recently Used (LRU) or round robin. Following selection of the stream register 408 from which a data prefetch request 406 is to be generated, prefetch engine 402 determines the amount of data to be requested by the data prefetch request 406 by reference to the state of the partial field 420 of the selected stream register 408 (block 654). In the depicted embodiment, the amount determination is binary, meaning that the data prefetch request 406 will request either a full cache line (e.g., 128 bytes) or a single predetermined subset of full cache line, such as a single granule (e.g., 32 bytes). Of course, in other embodiments, prefetch engine 402 may select any of multiple sizes of partial cache lines or a fall cache line as the amount of data to be prefetched.

In the depicted embodiment, if prefetch engine 402 determines at block 654 that the state of partial field 420 indicates a full cache line, prefetch engine 402 generates a data prefetch request 406 for a full cache line at block 656. Alternatively, if prefetch engine 402 determines at block 524 that the state of partial field 420 indicates a partial cache line, prefetch engine 402 generates a data prefetch request 406 for a partial cache line (e.g., a single granule) at block 658. Following either block 656 or block 658, prefetch engine 402 transmits the data prefetch request 406 to the memory hierarchy (e.g., to L2 cache 230 or to IMCs 206) in order to prefetch the target partial or full cache line into cache memory. Thereafter, the process depicted in FIG. 6C terminates at block 662.

As has been described, in at least some embodiments, a processor detects during execution of program code whether a load instruction within the program code is associated with a hint. In response to detecting that the load instruction is not associated with a hint, the processor retrieves a full cache line of data from the memory hierarchy into the processor in response to the load instruction. In response to detecting that the load instruction is associated with a hint, a processor retrieves a partial cache line of data into the processor from the memory hierarchy in response to the load instruction.

While the invention has been particularly shown as described with reference to a preferred embodiment, it will be understood by those skilled in the art that various changes in form and detail may be made therein without departing from the spirit and scope of the invention. For example, although aspects of the present invention have been described with respect to a computer system executing program code that directs the functions of the present invention, it should be understood that present invention may alternatively be implemented as a program product for use with a data processing system. Program code defining the functions of the present invention can be delivered to a data processing system via a variety of computer readable media, which include, without limitation, computer readable storage media (e.g., a computer memory, CD-ROM, a floppy diskette or hard disk drive), and communication media, such as digital and analog networks. It should be understood, therefore, that such computer readable media, when carrying or storing computer readable instructions that direct the functions of the present invention, represent alternative embodiments of the present invention.

What is claimed is:

1. A method of data processing, said method comprising:
  compiling a plurality of instructions to obtain program code executable by a processor, wherein the compiling includes determining expected utilization of demand-fetched data and, based on the determining, associating at least one of a plurality of load instructions in the program code with a hint in the program code indicating that less than a full cache line of data is to be retrieved from a memory hierarchy associated with the processor;
  during execution of program code by the processor, the processor detecting whether a load instruction among the plurality of load instructions within the program code is associated by the program code with the hint within the program code;

in response to detecting that the load instruction is not associated with the hint, the processor performing a demand fetch to retrieve a full cache line of data from the memory hierarchy into the processor in response to the load instruction; and in response to detecting that the load instruction is associated by the program code with the hint within the program code, the processor performing a demand fetch to retrieve a partial cache line of data into the processor from the memory hierarchy in response to the load instruction.

2. The method of claim 1, wherein:

performing a demand fetch to retrieve a partial cache line comprises retrieving a selected subset of bytes of a target cache line of the load instruction; and the selected subset of bytes that is retrieved is indicated by the hint.

3. A processor that, during execution of program code, detects whether a load instruction within the program code is associated by the program code with a compiler-generated hint within the program code indicating that, of a full cache line of data targeted by the load instruction, less than the full cache line of data is expected to be utilized, wherein the processor, responsive to detecting that the load instruction is not associated with the hint, performs a demand fetch to retrieve the full cache line of data from a memory hierarchy into the processor in response to the load instruction and, responsive to detecting that the load instruction is associated by the program code with the hint within the program code, performs a demand fetch to retrieve a partial cache line within the full cache line into the processor from the memory hierarchy in response to the load instruction.

4. The processor of claim 3, wherein said processor comprises:

an instruction sequencing unit that retrieves instructions for execution;

at least one execution unit that executes instructions including the load instruction; and a data prefetch unit that prefetches data in advance of demand.

5. The processor of claim 3, wherein the partial cache line comprises a portion of a target cache line of the load instruction indicated by the hint.

6. A data processing system, comprising:

a system memory;

a system interconnect; and a processor in accordance with claim 3 coupled to the system memory and to the system interconnect.

7. A program product, comprising:

a computer readable storage medium; and code processing program code stored within the computer readable storage medium that, when executed by a computer system, causes the computer system to perform:

responsive to receiving input program code containing a load construct, evaluating references to data demand-fetched by the load construct to determine expected utilization of the demand-fetched data;

in response to determining that a first number of data granules of the demand-fetched data are expected to be utilized, generating post-processed program code containing a hint indicating that only a partial cache line of data should be demand fetched by a load instruction in the post-processed program code corresponding to the load construct in the input program code; and in response to determining that a second number of data granules of the demand-fetched data are expected to be utilized, generating post-processed program code containing the load instruction but omitting the hint.

8. The program product of claim 7, wherein:

the code processing program code comprises a compiler;

the input program code comprises source code; and the post-processed program code comprises object code.

9. The program product of claim 7, wherein the code processing program code generates post-processed program code containing the hint only in response to evaluating that fewer than all granules of a cache line targeted by the load construct are referenced by the input program code.

10. The program product of claim 7, wherein the code processing program code marks the load instruction of the post-processed program code with the hint.

* * * * *